April 15, 1947.  D. A. FLETCHER ET AL  2,418,828
POLYMERIZATION OF METHYL METHACRYLATE
Filed May 29, 1946
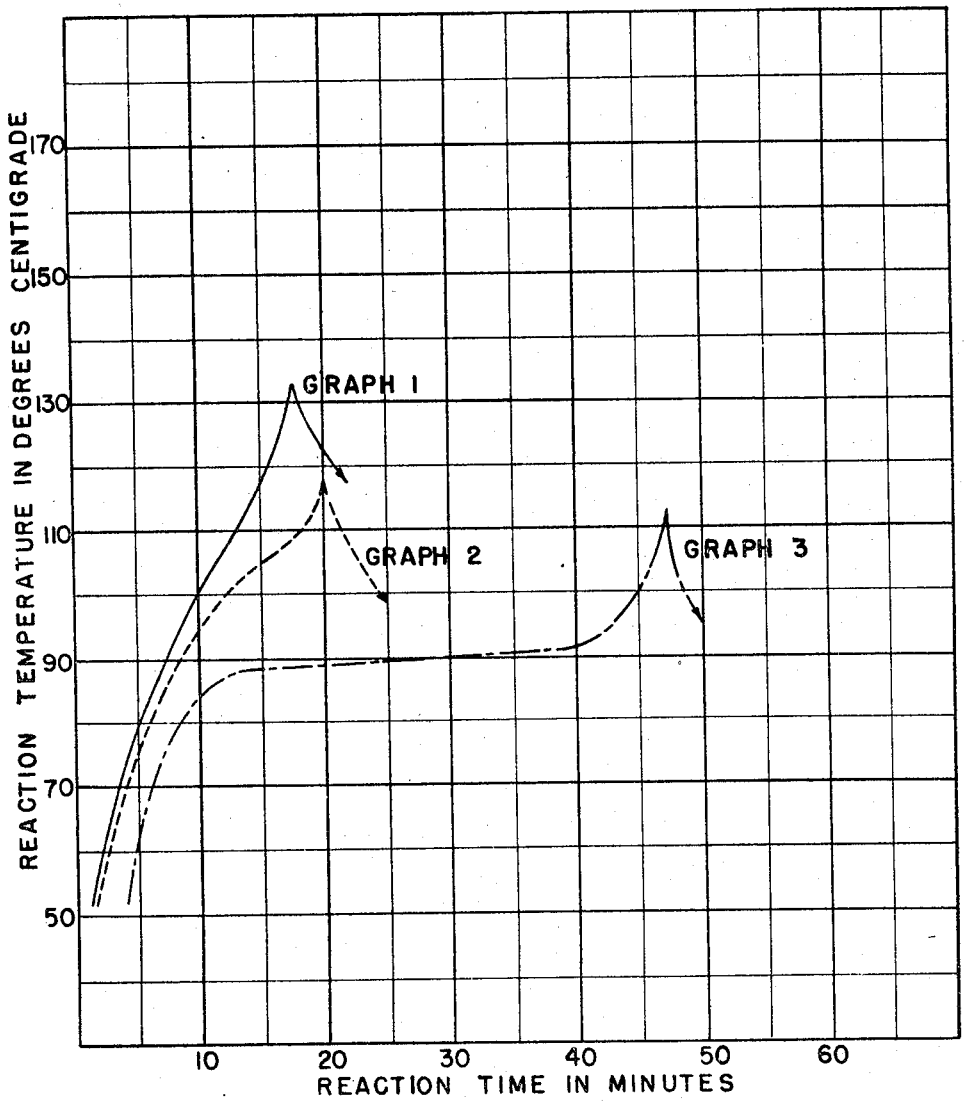
David A. Fletcher
Frederick L. Johnston INVENTORS
BY J. M. Castle Jr.
ATTORNEY Patented Apr. 15, 1947

2,418,828

UNITED STATES PATENT OFFICE 2,418,828

POLYMERIZATION OF METHYL METHACRYLATE

David A. Fletcher, Pompton Plains, N. J., and Frederick L. Johnston, Claymont, Del., assignors to E. I. du Pont de Nemours & Company, Wilmington, Del., a corporation of Delaware Application May 29, 1946, Serial No. 673,138

6 Claims. (Cl. 260—83)

This invention relates to the polymerization of methyl methacrylate and other saturated aliphatic alcohol esters of methacrylic acid or polymerizable materials comprising predominately an ester of methacrylic acid to form resins possessing a high degree of freedom from adverse color characteristics and from unmolding tendencies and, more particularly, it relates to the preparation of molding powders comprising such resins.

Polymerized methyl methacrylate possessing a granular form suitable for use as a molding powder may be economically prepared by polymerizing the monomeric material while dispersed in water as a suspension. If a polymeric material which is to be used for injection or compression molding is to be produced by such a procedure, the polymerization modifying agencies must be adjusted so as to produce a resin possessing only a moderate molecular weight. The necessity of preparing a plastic material of only moderate molecular weight, i. e., in the neighborhood of 20,000, as opposed to a plastic material possessing a high molecular weight, i. e., in the neighborhood of 100,000, when said plastic material is to be used for molding, arises from the fact that when plastic materials of high molecular weight are molded, the molded articles therefrom possess a high degree of unmolding tendency. On the other hand, articles molded from a polymethyl methacrylate plastic material possessing a moderate molecular weight have relatively low tendencies toward unmolding.

Those polymerization modifying agencies which may most readily be varied in order to control the molecular weight of any polymerized material, are temperature and catalyst concentration. Thus, all other things being equal, the apparent molecular weight of the resulting polymer varies inversely with the catalyst concentration. Likewise, all other things being equal, the molecular weight varies inversely with the polymerization temperature. Consequently, the apparent molecular weight of methyl methacrylate when polymerized by the discussed granular process may be controlled within that range which yields a plastic material possessing a low degree of unmolding tendency, i. e., 14,000 to 40,000, by proper choice of catalyst and reaction temperature. Thus, it is possible to employ temperatures between approximately 60° C. and 200° C. and catalyst concentrations between 0.005% and 2.0% of the monomeric material in order to obtain the indicated limits of molecular weight. Furthermore, the molecular weight and, accordingly, the tendency toward unmolding, of the polymerized material may be controlled by the use of inhibitors and other modifying materials, e. g., phenols, mercaptans, sulfonates and amines. It is obvious to anyone skilled in the art that both temperature and catalyst concentration must be specified in order to satisfactorily define the reaction conditions required to obtain polymeric material possessing desirable molding characteristics. Hence, if both temperature and catalyst concentration be high, the molecular weight will be excessively low, while if the temperature and catalyst concentration both are low, the molecular weight of the resulting polymeric material will be excessively high for use as a molding material. However, consideration must be given to characteristics other than just molecular weight if a completely satisfactory polymeric material is to be obtained.

The polymerization of methyl methacrylate material is always accompanied by the evolution of considerable exothermic reaction heat. Therefore, in order to prevent the speed of polymerization becoming excessive and uncontrollable, it has generally been the practice to employ relatively low temperatures and high catalyst concentrations in order to obtain a molding composition possessing satisfactory unmolding tendencies. However, the use of high temperatures for the production of moderate valued molecular weight, polymeric materials has been employed in the past, but, generally, when this practice has been followed the peak temperature of polymerization has been approached with extreme care and over a rather extended period of time because of the fear that the generated exothermic heat might cause the reaction to get out of control.

In addition to freedom from a tendency toward unmolding, granular plastic material which is to be suitable for use as a molding powder should be free from adverse coloration and possess good clarity. Those procedures generally employed by the art in the past for the production of plastic materials suitable for use as a molding powder have invariably resulted in the production of a material having more or less of a yellow discoloration. Thus, since low reaction temperatures have been considered desirable in the past in order to effect the proper operational control, high catalyst concentrations have been employed. High polymerization temperatures and low catalyst concentrations have been employed in the past but even this expedient failed to yield resins of satisfactory color characteristics.

An object of the present invention is to provide polymeric materials comprising predominantly methyl methacrylate or other saturated aliphatic alcohol esters of methacrylic acid which are substantially free from any adverse coloration and which, when molded into shaped articles, are substantially free from unmolding tendencies.

A further object is to provide a method whereby the monomers of said materials may be polymerized to yield such plastic materials. To provide molding powders of said materials which may be calendered, extruded, or injection molded to give shaped articles possessing the above discussed desirable characteristics, likewise is an object of this invention. Further objects will become apparent from the description of the invention given hereinafter.

The above objects are accomplished according to the present invention by forming an aqueous dispersion of a monomeric saturated aliphatic alcohol ester of methacrylic acid and from 1.0% to 0.005%, by weight of the monomer, of benzoyl peroxide, at a temperature below about 80° C., heating the dispersion to cause its temperature rapidly to rise to at least 110° C. and keeping the polymerization of the ester at a temperature between 110° C. and the depolymerization temperature of the polymer formed, the process being so controlled that the monomeric ester is not in contact with the benzoyl peroxide for greater than 15 minutes within the temperature interval of 40° C. to 110° C., nor for greater than 10 minutes within the temperature interval of 80° C. to 110° C. More specifically, the invention applies particularly to methyl methacrylate, the aqueous dispersion is preferably formed at a temperature below about 40° C., and the peak temperature of the dispersion is preferably not allowed to exceed 150° C.

It is a discovery of the present invention that not only are the color and tendency toward unmolding of polymerized methyl methacrylate and other methacrylates dependent upon the temperature of polymerization when benzoyl peroxide is used as a polymerization catalyst, but also upon the rate at which the peak temperature of polymerization is effected. Thus, methyl methacrylate polymerized at a peak temperature of 114° C. and under conditions which require 42 minutes to raise the temperature of the polymerization mixture from 60° C. to 110° C. exhibited 7.5% unmolding at 80° C., and a compression mold disc 0.75 inch in thickness had a very yellow center. On the other hand, methyl methacrylate polymerized at a peak temperature of 134° C. and under conditions whereby only 11 minutes time elapsed in heating the reaction mixture from 60° C. to 110° C., and the whole process controlled so that the methyl methacrylate monomer was not in contact with the benzoyl peroxide for more than 15 minutes within the temperature interval of 40° C. to 110° C., exhibited 1.2% unmolding at 80° C., and a compression molded shape of this material 0.75 inch in thickness had a center devoid of any yellow discoloration.

The above discussed fundamental principle of this invention is applicable to methacrylic esters which produce plastic materials such as methyl, ethyl, propyl, and butyl methacrylates when they are polymerized in aqueous suspension in the presence of benzoyl peroxide as the polymerization catalyst. Furthermore, the specific limits disclosed herein are applicable to mixtures of methacrylic acid esters and other polymerizable materials such as styrene, vinyl acetate, acrylic esters of saturated aliphatic alcohols such as ethyl and butyl acrylates, fumaric esters, itaconic esters, vinyl ketones, and the like, provided that the proportion of the other polymerizable materials be not in excess of 20% by weight of the total monomer concentration.

The process of this invention is carried out by suspending a mixture of the monomeric methacrylate, with or without other polymerizable compounds, in water by any convenient method, such as continuous agitation of said water, and while maintaining the polymerizable material in said dispersed state subjecting the suspension to the discussed reaction conditions. Dispersing and granulating agents or the like may be employed in order to aid in the dispersing of the polymerizable material. Obviously, since the polymerization temperature is above the boiling point of the reaction mixture, it is necessary to carry out the reaction in a vessel in which the reaction may be conducted at elevated pressures.

Dyes, plasticizers, pigments, mold lubricants, inhibitors, molecular weight modifiers and the like may be added to the monomeric materials when polymerized according to the process of the present invention, or these materials may be added subsequent to polymerization by any known method for accomplishing this addition.

As indicated above, the rate and degree of heating of the polymerization dispersion is of utmost importance in this invention. Thus, the reaction conditions should be so adjusted that the ultimate reaction temperature shall be above 110° C., and the reaction mixture should not be allowed to remain within the temperature interval of 40° C. to 110° C. for more than 15 minutes. Furthermore, the reaction suspension should not be permitted to remain within the temperature interval of 80° C. to 110° C. for more than 10 minutes. Moreover, the rate of heating of the polymerization suspension after the monomer material has been suspended in the aqueous medium should preferably be substantially uniform until the temperature has reached at least 110° C. Uniformity of heating of the suspension within the critical temperature range, i. e., 40° C.–110° C., is required for the full utilization of the novel features of the present invention and to permit safe operation of the polymerization reaction. These defined polymerization conditions are based upon the discovery that the rate of color formation in the described polymerization is a function of temperature, the color formation rate being greatest at about 80° C. and substantially negligible below 40° C. and above 110° C. Hence, the major portion of the polymerization reaction should be conducted above 110° C. and the polymerization mixture should be allowed to remain within the temperature interval of 40° C. to 110° C. only as long as is operationally necessary if the optimum in color is desired. Substantially colorless polymeric materials may be obtained only if the reaction conditions be within the limits defined above.

In the production of colorless polymeric materials, applicants have discovered that it is the period that the methacrylate monomer is in contact with the benzoyl peroxide catalyst within the temperature intervals defined which is critical, regardless of whether the monomer is dispersed in water or not. Consequently, an essential part of this invention is to control the process throughout so that contact of any kind between the monomer and benzoyl peroxide is limited to 15 minutes within the temperature interval of 40° C. to 110° C. and to 10 minutes within the temperature interval of 80° C. to 110° C. Contact of the monomer with the benzoyl peroxide at temperatures below 40° C. is apparently without any effect on the color of the resulting polymer although there is no point in unduly prolonging the contact even at these low temperatures.

Since the polymerization of methacrylic acid esters is an extremely exothermic reaction, the external heating of the reaction mixture must be conducted with considerable operational judgment. Hence, since the exothermic heat of reaction can cause the reaction temperature to rise, even in the absence of external heating, the heating must be discontinued as the peak temperature is approached and in order to maintain the reaction under control, it is desirable at this point to apply external cooling. A convenient method whereby this operation may be mechanically accomplished is disclosed in B. M. Marks U. S. Patent 2,325,067, patented July 27, 1943. Obviously, the temperature and time at which external heating is discontinued is dependent upon the nature and construction of the reaction apparatus. Therefore, these factors must be determined in connection with the specific apparatus employed for the polymerization.

It has been found that, when the polymerization is conducted in a heated jacket reaction vessel, the temperature applied to said jacket in order to heat the reaction mixture should not be in excess of 130° C. If this temperature limit be exceeded, excessive agglomeration of resin upon the walls of the reaction vessel results. Obviously, the ultimate polymerization temperature is not limited to this temperature since the exothermic heat of reaction may be utilized to heat the polymerization reaction. Conversely, if the temperature applied to the heating jacket be less than 100° C., the heating rate of the polymerization dispersion will not be sufficiently rapid. Saturated steam at a pressure of 15 pounds per square inch has been found most advantageous as a heating material, whereas steam at a pressure of 2 pounds per square inch, or hot water of a temperature of 95° C. have been demonstrated to be unsatisfactory, since these heating media fail to heat at the required rate.

The use of peak polymerization temperatures above 150° C. promote undue coalescence of the suspended polymeric particles and it is, therefore, desirable to limit the upper limit of polymerization temperature to this value. Furthermore, if a jacket temperature not in excess of 130° C. is employed, as discussed above, the heat of polymerization is generally not sufficient to carry the temperature much in excess of this figure, i. e., 150° C. Likewise, safety hazards associated with high polymerization temperatures counsel against the use of temperatures above 150° C.

The exact concentration of benzoyl peroxide used in conjunction with the process of the present invention depends upon a number of factors. Thus, the presence of small amounts of inhibitors, the presence of oxygen, and similar reaction rate retarders in the polymerizing materials, may necessitate changes in catalyst concentration. Accordingly, the optimum benzoyl peroxide concentration which is to be employed in executing the process of the present invention is best determined experimentally. However, it has been discovered that in order to operate the present process to produce a polymeric product suitable for molding, the concentration of the benzoyl peroxide should be held within the limits of 1.0% and 0.005% and, preferably, between the limits of 0.5% and 0.10%. If greater than this amount of benzoyl peroxide be employed the resulting polymeric material will possess an excessively low molecular weight, i. e., below 14,000, and the product will be brittle. On the other hand, the employment of less than the indicated amount of benzoyl peroxide may result in a product of too high molecular weight, i. e., above 40,000, which will possess an excessive tendency toward unmolding. Moreover, the use of no catalyst is extremely inadvisable since the progress of the reaction then becomes erratic and products of an unpredictable nature are obtained.

It should be appreciated that the present invention is based on the use of a specific polymerization catalyst, i. e., benzoyl peroxide. While the underlying principles of the present invention are probably applicable to the polymerization of the herein considered esters while employing other polymerization catalysts, there is no basis for expecting the particular range of conditions herein specified to apply generally for all polymerization catalysts although the conditions would be expected to apply more or less with a polymerization catalyst closely analogous to benzoyl peroxide chemically and in its behavior as a polymerization catalyst.

The polymeric materials of the present invention may be subjected to a step of malaxation to decrease their molecular weight, but it is obviously desirable that the initial molecular weight be not so high, i. e., much in excess of 40,000, that the step of malaxation must be unduly prolonged solely in order to reduce it into the indicated, desired range.

It will be apparent to those skilled in the art that under certain circumstances products of good color characteristics will not be produced even if the process of the present invention be employed. Thus, if the monomeric materials which are to be polymerized are unduly contaminated with foreign materials which tend to discolor even under the mildest conditions, the final product will generally be discolored. Therefore, these monomeric materials should be relatively pure in order that the resulting polymeric products may possess desirable characteristics. However, the process of the present invention may be employed to yield polymeric products of good physical quality from slightly contaminated monomers.

The production of polymeric materials according to specific embodiments of this invention is described in the following examples, in which all parts are by weight, and with reference to the drawing, the single figure of which shows three temperature-time graphs.

EXAMPLE I

| | Parts |
|---|---|
| Water | 10,322 |
| Dibasic sodium phosphate | 100 |
| Partial sodium salt of polymethacrylic acid | 3.25 |
| Monomeric methyl methacrylate | 5,000 |
| Benzoyl peroxide | 25 | are charged at room temperature into a five gallon, glass lined reaction kettle possessing an external heating jacket. The contents of the vessel, while subjected to agitation, are heated by means of steam at a pressure of 15 pounds per square inch circulating through the external heating jacket to a temperature of approximately 120° C. At this point the external heating is discontinued, the agitation is continued, and the exothermic heat of reaction is allowed to continue to heat the reaction mixture to the ultimate polymerization temperature, which in this case is 134° C. Thereafter, the temperature of the reaction mixture is reduced by circulating cold water through the jacket of the vessel. When the reaction mixture has reached substantially room temperature, the reaction mixture is discharged from the autoclave and the granular polymeric material separated in known fashion. The properties of the resulting polymeric material are listed in Table I below. The temperature-time relationships of the reaction are plotted in graph 1 of the drawing.

EXAMPLE I-A

The process of Example I is carried out with the exception that external heating is discontinued at approximately 100° C. and the ultimate reaction temperature is allowed to reach only 119.5° C. The temperature vs. time curve of this polymerization is given in graph 2 of the drawing. Properties of the polymeric material thus produced are delineated in Table I below.

EXAMPLE I-B

The process of Example I is duplicated with the exception that external heating is accomplished by the use of 2.5 pounds per square inch steam in the external jacket, and is discontinued at approximately 79° C. The ultimate reaction temperature is allowed to reach 112.2° C. The temperature course of this reaction is illustrated in graph 3 of the drawing. The properties of the resulting plastic material are listed in Table I.

In the above series, Example I clearly is within the preferred limits hereinbefore discussed for the present invention. As shown in graph 1, the temperature rise through the critical temperature intervals is well within the maximum time limits of the invention and, consequently, a product of optimum properties should have been obtained and, in actual fact, was as Table I indicates. Example I-A almost observes the limits of the invention but the time for the temperature to rise through the interval from 40° C. to 110° C. slightly exceeds the maximum period of 15 minutes. The properties of the resulting product as shown in Table I are appreciably inferior to those of the product of Example I and yet are somewhat better than the properties of the product of Example I-B which is run more in line with the practice heretofore without any regard to the time required for the temperature of the suspension to rise from 40° C. to 110° C.

Table I

| Unrolled, Compression Molded: | Example I | Example I-A | Example I-B |
|---|---|---|---|
| Color of molded disc 0.75 inch thick. | colorless | pale yellow center. | yellow center. |
| Numerical value of yellow color—per cent transmission of wave length 4000Å. thru 0.75 inch section. | 84.5% | 78% | 75%. |
| Rolled, injection molded: Per cent unmolding 2 hrs. at— | | | |
| 50° C | 0 | 0 | 0. |
| 70° C | 0.4 | 0.8 | 0.8. |
| 80° C | 1.2 | 5.5 | 7.5. |
| 90° C | 5.5 | 13.3 | 19.0. |
| Molecular weight | 14,420 | 24,380 | 66,400. |
| Viscosity (time of efflux of 1% CHCl₃ solution through capillary). | 29.8 sec | 38.1 sec | 73.1 sec. |

EXAMPLE II

| | Parts |
|---|---|
| Water | 10,000 |
| Dibasic sodium phosphate | 100 |
| Partial sodium salt of polymethacrylic acid | 2.5 |
| Monomeric methyl methacrylate | 4,400 |
| Benzoyl peroxide | 25 |
| Octadecyl alcohol | 100 |
| Monomeric styrene | 500 | are mixed together and charged at room temperature into a glass lined pressure kettle. The contents are vigorously agitated and the temperature of the same is raised from approximately 40° C. to 110° C. in 10 minutes. The temperature is then held below 140° C. by the controlled circulation of cold water in the jacket of the vessel. At the end of 40 minutes the temperature of the polymerization mixture is reduced to room temperature by further circulation of cooling water through the kettle's jacket. When cool, the mixture is discharged from the pressure vessel and the polymeric material isolated in known manner. A compression molded chip 0.75 inch in thickness of the produced resin is completely colorless. The polymer possesses a molecular weight of 18,900 and at a test strip injection molded from the polymer at 205° C. and 20,000 pounds per square inch exhibits 0.8% unmolding at 80° C.

EXAMPLE III

In a jacket kettle capable of withstanding pressure and provided with a gas-tight cover, an agitator and valved inlet and bottom outlet ports are placed.

| | Parts |
|---|---|
| Water (distilled) | 228 |
| Partial sodium salt of polymethacrylic acid | 0.2 |
| Dibasic sodium phosphate | 2.3 | and the mixture is heated to about 80° C. The following solution is formed:

| | Parts |
|---|---|
| Methyl methacrylate monomer | 100 |
| Dimethyl fumarate | 11.4 |
| Stearyl alcohol (commercial grade) | 2.3 |
| Benzoyl peroxide | 0.6 |

A heated coil is connected with the inlet port and the methyl methacrylate solution is passed, after filtering, therethrough at such a rate that the same attains a temperature of about 80 C. as it passes from the heated coil through the inlet port into the agitated contents of the kettle. The valve in the loading port is closed and the vessel's contents are heated as rapidly as possible to 110° C., while continuing the agitation. About twelve minutes are required for the entire monomer addition and heating procedure. The temperature of the agitated kettle contents is maintained at 110° C. until the polymerization is completed. The resulting polymer has a molecular weight of 25,000 and after rolling on hot rolls for 10 minutes, the product possesses a molecular weight of 20,000. The material possesses good injection molding properties and good heat resistance. The color and clarity are satisfactory.

In this example the aqueous dispersion is formed at about 80° C. or slightly below and the methyl methacrylate monomer containing the benzoyl peroxide is heated so rapidly in the heated coil that it reaches a temperature of 40° C. only momentarily before passing into the kettle. Hence, none of the monomer is in contact with the benzoyl peroxide for as long as 15 minutes within the temperature interval of 40° C. to 110° C. While some of the monomer first introduced into the kettle may have been in contact with the benzoyl peroxide for slightly longer than 10 minutes in the temperature interval of 80° C. to 110° C., most of it was not. This example illustrates about the extreme time during which the monomer and benzoyl peroxide can be in contact throughout the critical temperature range without noticeable discoloration.

EXAMPLE IV

The ingredients of Example III are polymerized by a procedure similar to that used in Example III. However, the aqueous phase is heated only to 65° C. and the monomer mixture is not preheated. Thus, the admixed monomer enters the aqueous phase at approximately room temperature, i. e., about 20° C. The temperature of the reaction mixture reaches 110° C. in thirteen minutes, passing through the temperature interval of 80° C. to 110° C. in somewhat under 10 minutes, and a peak temperature of 118° C. is reached several minutes later. The product by this procedure possesses a molecular weight of 28,000, and a compression molded chip of the material exhibits complete freedom from adverse coloration.

The procedure of this example is found to offer greater ease of operation than that employed in Example III.

The unmolding tendency of the plastic materials, as discussed herein was measured by the following simple test. The testpiece consists of an injection molded bar 5″ x ½″ x ⅛″ in size. The longest dimension of the bar is very accurately measured, and then the bar is placed in an oven for 24 hours at 50° C. At the end of this heating, its longest dimension is again measured. The unmolding tendency at 50° C. will then be expressed as per cent unmolding, and will be the ratio of the original length minus the length after heating to the original length times 100. The same bar is then heated for another 24 hour period at 70° C. and the per cent unmolding again determined as before. The unmolding tendency at higher temperatures can be likewise determined by repeating the described operation at the elevated temperature.

The molecular weights set out in the specification were measured by the method of Staudinger (1933 Ann. 502, 201).

The plastic materials made in accordance with the present invention may be utilized for all the purposes for which polymerized esters of methacrylic acid are known to be useful. These products are of particular utility in those instances where freedom from any substantial adverse coloration is required. Furthermore, articles which are injection molded or compression molded from these products will not warp or otherwise dimensionally distort under normal usage.

As many apparently widely different embodiments of this invention may be made without departing from the spirit and scope thereof, it is to be understood that the invention is not limited to the specific embodiments thereof except as defined in the appended claims.

We claim:

1. Process of polymerizing a saturated aliphatic alcohol ester of methacrylic acid, which comprises forming an aqueous dispersion of a monomeric saturated aliphatic alcohol ester of methacrylic acid and from 1.0% to 0.005%, by weight of the monomer, of benzoyl peroxide, at a temperature below about 80° C., heating said dispersion to cause its temperature rapidly to rise to at least 110° C. and completing the polymerization of said ester at a temperature between 110° C. and the depolymerization temperature of the polymer formed, the process being so controlled that said monomeric ester is not in contact with said benzoyl peroxide for greater than 15 minutes within the temperature interval of 40° C. to 110° C., nor for greater than 10 minutes within the temperature interval of 80° C. to 110° C.

2. Process of polymerizing a saturated aliphatic alcohol ester of methacrylic acid, which comprises forming an aqueous dispersion of a monomeric saturated aliphatic alcohol ester of methacrylic acid and from 1.0% to 0.005%, by weight of the monomer, of benzoyl peroxide, at a temperature below about 40° C., heating said dispersion to cause its temperature rapidly to rise to at least 110° C. and completing the polymerization of said ester at a temperature between 110° C. and the depolymerization temperature of the polymer formed, the process being so controlled that said monomeric ester is not in contact with said benzoyl peroxide for greater than fifteen minutes within the temperature interval of 40° C. to 110° C., nor for greater than ten minutes within the temperature interval of 80° C. to 110° C.

3. Process of polymerizing a saturated aliphatic alcohol ester of methacrylic acid, which comprises forming an aqueous dispersion of a monomeric saturated aliphatic alcohol ester of methacrylic acid and from 0.5% to 0.10%, by weight of the monomer, of benzoyl peroxide, at a temperature below about 40° C., heating said dispersion to cause its temperature rapidly to rise to at least 110° C. and completing the polymerization of said ester at a temperature between 110° C. and 150° C., the process being so controlled that said monomeric ester is not in contact with said benzoyl peroxide for greater than fifteen minutes within the temperature interval of 40° C. to 110° C., nor for greater than ten minutes within the temperature interval of 80° C. to 110° C.

4. Process of polymerizing methyl methacrylate which comprises forming an aqueous dispersion of monomeric methyl methacrylate and from 1.0% to 0.005%, by weight of the monomer, of benzoyl peroxide, at a temperature below about 80° C., heating said dispersion to cause its temperature rapidly to rise to at least 110° C. and completing the polymerization of said methyl methacrylate at a temperature between 110° C. and the depolymerization temperature of the polymer formed, the process being so controlled that said monomeric methyl methacrylate is not in contact with said benzoyl peroxide for greater than 15 minutes within the temperature interval of 40° C. to 110° C., nor for greater than 10 minutes within the temperature interval of 80° C. to 110° C.

5. Process of polymerizing methyl methacrylate which comprises forming an aqueous dispersion of monomeric methyl methacrylate and from 1.0% to 0.005%, by weight of the monomer, of benzoyl peroxide, at a temperature below about 40° C., heating said dispersion to cause its temperature rapidly to rise to at least 110° C. and completing the polymerization of said methyl methacrylate at a temperature between 110° C. and the depolymerization temperature of the polymer formed, the process being so controlled that said monomeric methyl methacrylate is not in contact with said benzoyl peroxide for greater than 15 minutes within the temperature interval of 40° C. to 110° C., nor for greater than 10 minutes within the temperature interval of 80° C. to 110° C.

6. Process of polymerizing methyl methacrylate which comprises forming an aqueous dispersion of monomeric methyl methacrylate and from 0.5% to 0.10%, by weight of the monomer, of benzoyl peroxide, at a temperature below about 40° C., heating said dispersion to cause its temperature rapidly to rise to at least 110° C. and completing the polymerization of said methyl methacrylate at a temperature between 110° C. and 150° C., the process being so controlled that said methyl methacrylate is not in contact with said benzoyl peroxide for greater than 15 minutes within the temperature interval of 40° C. to 110° C., nor for greater than 10 minutes within the temperature interval of 80° C. to 110° C.

DAVID A. FLETCHER.
FREDERICK L. JOHNSTON.